United States Patent
Eguchi

(10) Patent No.: US 8,729,756 B2
(45) Date of Patent: May 20, 2014

(54) CANNED MOTOR PUMP AND METHOD FOR FILLING FILLING MEMBER INTO STATOR CHAMBER THEREOF

(71) Applicant: Nikkiso Co., Ltd., Tokyo (JP)

(72) Inventor: Masaaki Eguchi, Higashi-Murayama (JP)

(73) Assignee: Nikkiso Co., Ltd. (JP)

( * ) Notice: Subject to any disclaimer, the term of this patent is extended or adjusted under 35 U.S.C. 154(b) by 0 days.

(21) Appl. No.: 13/750,332

(22) Filed: Jan. 25, 2013

(65) Prior Publication Data

US 2013/0136630 A1   May 30, 2013

Related U.S. Application Data

(63) Continuation of application No. PCT/JP2011/064264, filed on Jun. 22, 2011.

(30) Foreign Application Priority Data

Apr. 14, 2011   (JP) ................................. 2011-089821

(51) Int. Cl.
*H02K 5/128* (2006.01)
*H02K 5/08* (2006.01)
*F04B 17/03* (2006.01)
*F04D 13/06* (2006.01)
*F04D 13/08* (2006.01)

(52) U.S. Cl.
CPC .............. *H02K 5/128* (2013.01); *H02K 5/1285* (2013.01); *H02K 5/08* (2013.01); *F04D 13/0606* (2013.01); *F04D 13/0626* (2013.01); *F04B 17/03* (2013.01)
USPC ................... 310/86; 310/43; 310/52; 310/87; 417/366; 417/423.7

(58) Field of Classification Search
CPC ....... H02K 5/08; H02K 5/128; H02K 5/1285; F04B 17/03; F04D 13/0606; F04D 13/0626
USPC ................ 310/43, 52, 86, 87; 417/366, 423.7
IPC ... H02K 5/08, 5/128; F04B 17/03; F04D 13/06, F04D 13/08
See application file for complete search history.

(56) References Cited

U.S. PATENT DOCUMENTS 4,546,130 A * 10/1985 Nishida et al. ................ 523/459
4,652,218 A *  3/1987 Tsutsui et al. ................ 417/368
(Continued)

FOREIGN PATENT DOCUMENTS

JP         56-167337 A    12/1981
JP         60-171750 A     9/1985
(Continued)

OTHER PUBLICATIONS

International Search Report for International Application No. PCT/JP2011/064264, mailed Aug. 16, 2011, with English translation.

(Continued)

*Primary Examiner* — John K Kim
(74) *Attorney, Agent, or Firm* — Cantor Colburn LLP

(57) ABSTRACT

A canned motor pump, wherein a motor stator is housed in a stator chamber that is a space between a tubular stator can for housing a motor rotor and a tubular stator band disposed coaxially with the stator can. The stator chamber is closed by annular end plates at the cylindrical ends between the stator can and the stator band. The stator chamber is filled with a filler. The filler is produced from spherical inorganic material particles filled into the stator chamber and resin for causing the particles to stick to each other. Consequently, the heat release performance of the stator of the canned motor pump is improved.

5 Claims, 2 Drawing Sheets

(56) References Cited

U.S. PATENT DOCUMENTS

| | | | |
|---|---|---|---|
| 5,490,319 A * | 2/1996 | Nakamura et al. | 29/596 |
| 5,612,393 A * | 3/1997 | Arakawa et al. | 523/145 |
| 6,396,159 B1 | 5/2002 | Shoji | |
| 7,300,263 B2 | 11/2007 | Mitsuda et al. | |
| 2005/0214135 A1 * | 9/2005 | Shibuya et al. | 417/357 |
| 2006/0284346 A1 * | 12/2006 | Okubo et al. | 264/482 |
| 2011/0094697 A1 * | 4/2011 | Ueno et al. | 164/4.1 |
| 2013/0136630 A1 * | 5/2013 | Eguchi | 417/366 |

FOREIGN PATENT DOCUMENTS

| | | |
|---|---|---|
| JP | 1-16096 B2 | 3/1989 |
| JP | 11-26652 A | 1/1999 |
| JP | 2002-121359 A | 4/2002 |
| JP | 2003-68978 A | 3/2003 |
| JP | 2004-68643 A | 3/2004 |
| JP | 2005-307914 A | 11/2005 |
| JP | 2006-191723 A | 7/2006 |

OTHER PUBLICATIONS

Notice of Grounds for Rejection for Japanese Application No. 2011-089821, mailed Nov. 1, 2011, with English translation (same as Notice of Reasons for Refusal for 2011-089821 prepared on Oct. 26, 2011 and mailed on Nov. 1, 2011).

Decision of Rejection for Japanese Patent Application No. No. 2011-089821, mailed Feb. 7, 2012, with partial English translation.

Notice of Grounds for Rejection for Japanese Patent Application No. 2011-089821, mailed Aug. 9, 2011, with English translation.

* cited by examiner

CANNED MOTOR PUMP AND METHOD FOR FILLING FILLING MEMBER INTO STATOR CHAMBER THEREOF

CROSS REFERENCE TO RELATED APPLICATIONS

This application is a continuation under 35 U.S.C. §120 of PCT/JP2011/064264, filed on 22 Jun. 2011, which is incorporated herein reference and which claimed priority to Japanese Application No. 2011-089821, filed 14 Apr. 2011. The present application likewise claims priority under 35 U.S.C. §119 to Japanese Application No. 2011-089821, filed 14 Apr. 2011, the entire content of which is also incorporated herein by reference.

TECHNICAL FIELD

The present invention relates to a canned motor pump, and in particularly, to a structure thereof.

BACKGROUND

A canned motor pump is a device having a turbo pump, such as a centrifugal pump or the like, and an electric motor for driving the turbo pump (hereinafter simply referred to as a motor), the pump and the motor being formed integrated with each other. The rotor of the motor is installed in a cylindrical stator can, while the stator of the motor is placed outside the stator can so as to surround the rotor. The rotating portion of the motor including the rotor is all installed in the stator can, and the stator can is filled with liquid that is handled by the pump. Installation of the rotating portion in the stator can eliminates a structure, such as a packing or the like, that slides together with the rotating portion and prevents leakage of the handled liquid. Meanwhile, the stator of the motor is installed in a stator chamber formed by the stator can and a housing surrounding the outer circumferential side of the stator. The stator chamber forms a space that is sealed to satisfy explosion prevention standards or the like. Patent Document 1 shows a canned motor having a stator chamber filled with resin.

RELATED ART DOCUMENT

Patent Document

Patent Document 1: Japanese patent Publication No. Hei 1-16096

A canned motor pump has a problem of heat radiation from the stator placed in the sealed stator chamber. There is known a technique in which the stator chamber is filled with resin having higher air heat conductivity than air to improve heat radiating efficiency as the air occupying the space in the stator chamber has low heat conductivity. With the resin filled, heat that is generated at the stator, in particular, at a coil end of the coil, is efficiently radiated to the outside through the resin. However, due to the characteristic of resin such that resin once expands and then shrinks before being cured in a curing process, a space with no filling resin is caused between the stator, stator can, and housing, and the cured resin when curing the resin filled in the stator chamber. This causes a problem of insufficient improvement of heat conductivity.

SUMMARY

At least an embodiment of the present invention may improve adhesion between a filling material filled in the stator chamber and the stator, the stator can and housing constituting the stator chamber, and the like, to thereby achieve efficient heat dissipation.

A canned motor pump according to at least en embodiment of the present invention is a canned motor pump including a stator can in a cylindrical shape positioned between a rotor and a stator of a motor, and a motor housing forming, together with the stator can, a stator chamber for installing the stator, the canned motor pump comprising a filling member including dried spherical inorganic material particles having a first heat conductive rate and filled in the stator chamber so as to contact each other, and silicone resin poured into the stator chamber so as to be introduced into between the spherical inorganic material particles that have been filled, and cured, to thereby bond the spherical inorganic material particles to each other, and having a second heat conductive rate higher than the first heat conductive rate. Vibration may be applied to the stator chamber when filling the dried spherical inorganic material particles into the stator chamber.

As the spherical inorganic material particles, any spherical material that has some degree of mechanical strength and is subjected to only slight change in volume due to change in temperature when curing the silicone resin can be used. Sintered spherical particles of either a simple substance or a mixture of materials generally referred to as ceramic, including alumina (aluminum oxide), zirconia (zirconium dioxide), silicon carbide, silicon nitride, and the like, sintered spherical particles of either a simple substance or a mixture mainly comprising metal oxide, including silicon dioxide, magnesium oxide, and the like, sintered spherical particles of either a simple substance or a mixture of natural minerals, including zircon, quartz, and the like, and sintered spherical particles of a mixture of ceramic and metal oxide or minerals, glass beads, or the like can be used. In particular, particles mainly comprising ceramic are preferred. The resin to be poured and cured is selected, based on the solution sending temperature of the canned motor pump or environmental temperature when using the canned motor pump.

A method according to at least an embodiment of the present invention for filling a filling member into a stator chamber of a canned motor pump including a stator can in a cylindrical shape positioned between a rotor and a stator of a motor and a motor housing forming, together with the stator can, a stator chamber for installing the stator comprises filling dried spherical inorganic material particles having a first heat conductive rate into the stator chamber so as to contact each other, thereafter pouring silicone resin into the stator chamber so as to be introduced into between the spherical inorganic material particles filled, and thereafter curing the silicon resin poured into the stator chamber by heating and drying to thereby bond the filled spherical inorganic material particles to each other, and having a second heat conductive rate higher than the first heat conductive rate. According to at least an embodiment of the present invention, the silicone resin may be poured after reducing the silicone resin with solvent to thereby decrease viscosity of the silicon resin.

According to at least an embodiment of the present invention, as spherical inorganic material particles subjected to only slight thermal expansion are used as a filler, the volume and shape are scarcely changed due to change in temperature when the resin is being cured. Thus, the spherical inorganic material particles are filled in the stator chamber while being adhered to the stator can, the housing, and the like, with no space left, and even when the resin is thereafter filled and cured, no space is caused between the filling member, or a mixture of the spherical inorganic material particles and the resin, and the stator, the stator can and housing constituting the stator chamber, and the like. This improves adhesion of the filling member and thus heat dissipation.

DETAILED DESCRIPTION OF EMBODIMENTS

Figure 1:
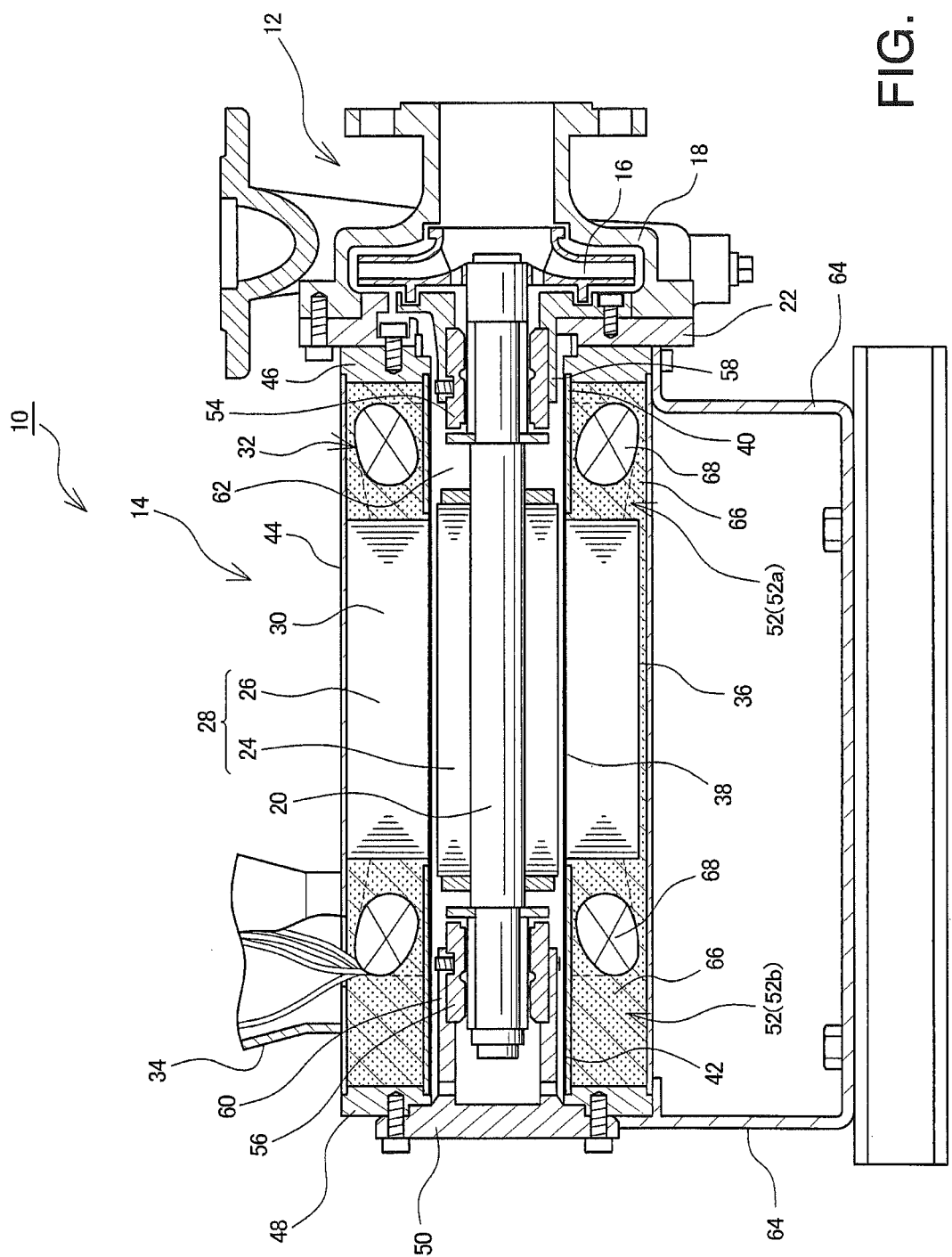
FIG. 1 is a cross sectional view of a canned motor pump according to this embodiment.

In the following, at least an embodiment of the present invention will be described referring to the drawings. FIG. 1 is a cross sectional view showing a schematic structure of a canned motor pump 10. The canned motor pump 10 has a pump portion 12 that is a centrifugal pump and a motor portion 14 for driving the centrifugal pump. The pump portion 12 is not limited to a centrifugal pump, and may be a turbo pump, such as a mixed flow pump, an axial-flow pump, or the like. In the pump portion 12, an impeller 16 is held in the casing chamber of a casing 18, and connected to an end of a motor shaft 20. A connection panel 22 is fixedly connected by a bolt on the side of the casing 18 closer to the rear surface of the impeller.

The motor portion 14 has a motor 28 including a rotor 24 and a stator 26, in which the rotor 24 is integrally connected to the motor shaft 20 and the stator 26 is placed surrounding the rotor 24. The stator 26 includes a stator core 30 and a coil 32, in which the stator core 30 has magnetic poles aligned on the substantially cylindrical inner circumferential surface thereof in the circumferential direction, and the coil 32 is formed by winding a conductive wire around each magnetic pole of the stator core. An end of the conductive wire of the coil 32 extends to a terminal box 34 and is connected to a terminal (not shown) provided in the terminal box. At least one axial direction groove 36 is formed on the outer circumferential surface of the stator core 30, extending in the axial direction of the motor.

A cylindrical stator can 38 is placed inside the stator core 30 and outside the rotor 24. That is, the stator can 38 is placed in contact with the inner circumferential surface of the stator core 30, that is, the top surfaces of the magnetic poles, and with a constant gap relative to the outer circumferential surface of the rotor 24. Back-up sleeves 40, 42 are provided on a portion of the stator can 38, the portion extending from the stator core 30 outward in the axial direction, while being adhered to the outer circumferential surface of the stator can 38. Each of the back-up sleeves 40, 42 has a cylindrical shape, and is thicker than the stator can 38 so that deformation of the stator can 38 can be prevented. A cylindrical stator band 44 is provided along the outer circumferential surface of the stator core 30. The stator can 38 and the stator band 44 are concentrically placed, and have substantially the same length in the axial direction.

Ring-shaped annular end panels 46, 48 are respectively provided on both ends of the stator can 38 and stator band 44 to seal the respective ends of the cylindrically shaped-space formed between the stator can 38 and the stator band 44. The annular end panel 46 on the side of the pump portion 12 is connected to the connection panel 22 by a bolt, while the annular end panel 48 on the opposite side from the pump unit 12 is connected by a bolt to a disk end panel 50 for closing an end of the space formed inside the stator can 38. The stator band 44, the two annular end panels 46, 48, and the disk end panel 50 can be considered as a motor housing for installing the motor 28. The stator 26 is installed in a space enclosed by, or formed using, the motor housing, in particular, the stator band 44, the two annular end panels 46, 48, and the stator can 38. This space will be hereinafter referred to as a stator chamber 52. The stator chamber 52 is divided by the stator core 30 into a stator chamber 52a on the motor side, and a stator chamber 52b on the opposite side. These divided stator chambers 52a, 52b are connected to each other via a space between the magnetic poles of the stator core 30 and the above mentioned axial direction groove 36.

The motor shaft 20 integral to the rotor 24 is supported at both ends thereof by the bearings 54, 56. The bearing 54 on the side of the pump portion 12 is held in a bearing housing 58 extending from the casing 18 of the pump portion 12, while the bearing 56 on the opposite side is held in a bearing housing 60 extending from the disk end panel 50. The space inside the cylindrical stator can 38, that is, a rotor chamber 62 where the rotor 24 is installed, is filled with handled liquid having been sucked and that is to be drained by the pump portion 12. Specifically, the handled liquid is introduced from the back surface side of the impeller 16 into the rotor chamber 62, then flows through the bearing 54 and nearby and further through the space between the rotor 24 and the stator can 38, and then reaches the space on the opposite side from the pump portion 12. The handled liquid further flows through a central opening (not shown) penetrating the motor shaft 20 at the center thereof along the axis before being returned to the sucking side of the impeller 16.

The canned motor pump 10 is entirely supported by a pedestal 64 fixed to the annular end panels 46, 48.

In the stator chamber 52, a filling member 66 is filled and cured. The coil end 68 projecting from the stator core 30 of the coil 32 is also buried in the filling member 66. The filling member 66 is a mixed material comprising spherical inorganic material particles and silicone resin. As spherical inorganic material particles, for example, Naigai Cera Beads (registered trademark) manufactured by Itochu Ceratech Corporation can be used. The particles are not perfectly round but round as a whole having no edges. The main component is aluminum oxide ($Al_2O_3$) and silicon dioxide ($SiO_2$). Silicone resin comprising components used as a binder can be used. To supply liquid at high temperature, resin that is superior in heat resistance is desired, and, for example, silicon resin KR-242R made by Shin-Etsu Silicone can be used.

To fill the filling member 66, initially, dried spherical inorganic material particles are poured into the stator chamber 52 from, for example, the terminal box 34. The spherical inorganic material particles having been poured from the terminal box 34 initially flow into the stator chamber 52b adjacent to the terminal box 34 and then reach the stator chamber 52a on the opposite side by passing through between the magnetic poles of the stator core 30 and in the axial direction groove 36. In the above, the stator chamber (stator chamber 52a) positioned farther from the inlet (terminal box 34) is kept lower, when necessary. Application of vibration can increase filling density. Spherical inorganic material particles have preferred fluidity due to their round shape, and can be filled densely into every space in the stator chamber due to their small particle diameter. After filling the spherical inorganic material particles, silicone resin is filled. Specifically, an opening for sucking resin is formed in advance on a lower part of the stator chamber 52, in particular, for example, on the annular end panel 46, and vacuum drawing or the like is applied to the stator chamber 52 from a side opposite from the opening, for example, from the terminal box 34 or the like, so that the resin is introduced between the spherical inorganic material particles. In order to increase the fluidity of the resin in the above, the resin may be reduced with appropriate solvent to be less viscous. Thereafter, the resin is dried with heat to be thereby cured. Use of spherical inorganic material particles enables separate pouring from resin into the stator chamber, which enables a filling process without the use of large-scale equipment for injection molding, for example. This makes the manufacturing less laborious.

Note that in a case where inconsistent shaped particles are used as a filler, the volume may decrease when curing the resin as edges of each particle are broken or folded, or particles that are hooked on each other at their edges are displaced. Meanwhile, as spherical particles are used in this embodiment, the particles remain adhering to one another, and decrease of the entire volume due to decrease of the space between particles is scarcely caused. Therefore, adhesion between the cured filling member 66 and members therearound, such as, for example, the stator can 38, the stator band 44, the back-up sleeves 40, 42, the stator core 30, and the coil 32, can be ensured, and heat radiation can be ensured as a space that deteriorates heat transfer is not caused. Moreover, as the resin is introduced between the tip end of the magnetic pole of the stator core 30 and the stator can 38, heat transfer in the space can be improved.

Further, although the spherical inorganic material particles contact the coil 32 both in flowing into the stator chamber 52 and after being cured, the spherical inorganic material particle does not damage the insulating cover of the coil conductive wire thanks to the absence of edges, different from inconsistently shaped particles.

Figure 2:
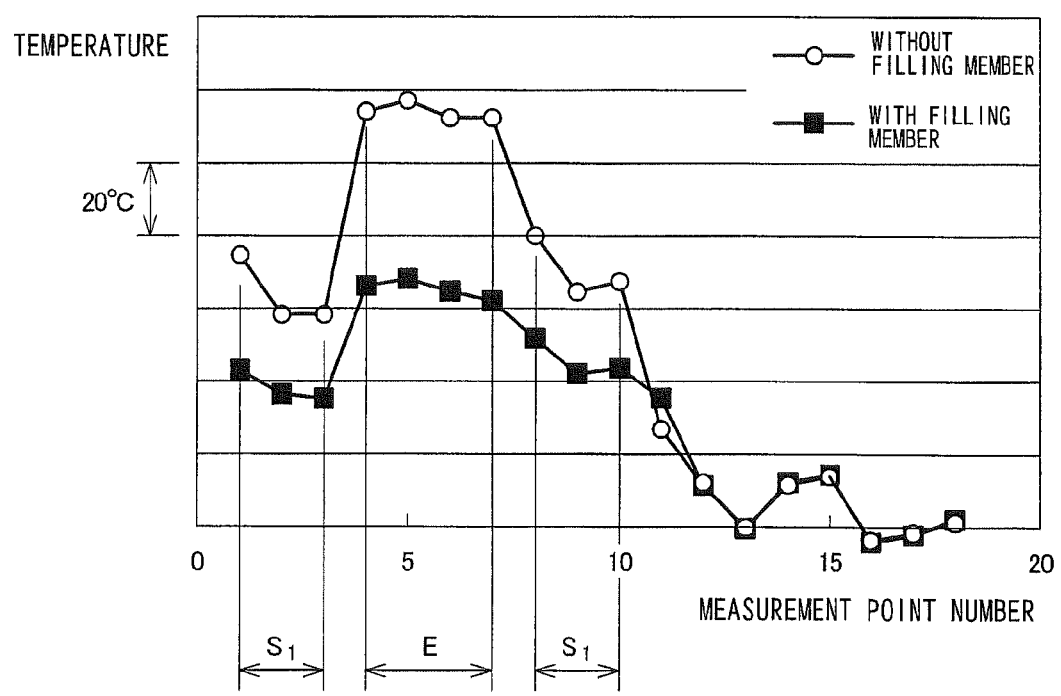
FIG. 2 shows an effect achieved by a filling member.

FIG. 2 shows temperature at the respective portions of the canned motor pump, in which a white circle "○" relates to a case using no filling member, and a black square "■" relates to a case using a filling member. The abscissa indicates a measurement point. Specifically, the measurement points in the respective ranges $S_1$ and $S_2$ shown indicate temperature at a portion between the magnetic poles, that is, on the coil surface in a slot, while the measurement point in the range E indicates the temperature on a coil end surface. The canned motor pump in use is a pump in the 30 kW output class, and temperature at a substantially saturated state with a load of 100% is shown. The filling member in use is a mixture of spherical ceramic particles and silicone resin, specifically, Naigai Cera Beads 60 (registered trademark) #400 made by Itochu Ceratech Corporation and silicone resin KR-242R made by Sin-Etsu Silicone. The diameter of particles with this number varies between 150 to 425 µm. The heat conductive rate of the Naigai Cera Beads 60 (registered trademark) is 0.56 (W/m·K); that of the silicone resin is 0.14 to 0.31 (W/m·K); and that of a filling member being a mixture of these is 0.68 (W/m·K). As shown in FIG. 2, the temperature of the coil decreases as a whole. In particular, a temperature decrease effect by about 50° C. is admitted with a coil end portion where temperature becomes particularly high.

As described above, in this embodiment, as a space around the coil end is filled with a filling member, even though inflammable gas should be caused in a portion, such as, on a terminal block or the like, where space is left unfilled with no filling member, the filling member blocks the pressure wave so that the pressure wave can be prevented from reaching the stator can.

Further, as the filling member remains adhering to the stator can, an effect can be expected such that the filling member supports the stator can to thereby prevent the stator can from being deformed.

The present invention is not limited to the above described embodiment, and includes all changes and modifications not departing from the technical range or gist of the present invention defined by the claims.

What is claimed is:

1. A canned motor pump comprising:
 a rotor;
 a stator;
 a stator can having a cylindrical shape and being provided between the stator and the rotor; and
 a motor housing;
 wherein the motor housing and the stator can define a stator chamber in which the stator is provided;
 wherein a filling member is provided in the stator chamber, the filling member comprising:
  a plurality of dried spherical inorganic material particles having a first heat conductive rate;
  silicone resin having a second heat conductive rate higher than the first heat conductive rate;
  wherein each of the plurality of spherical inorganic material particles is in contact with others of the plurality of spherical inorganic material particles;
  wherein the silicone resin is provided between the plurality of spherical inorganic material particles so as to fill the stator chamber;
  wherein the plurality of spherical inorganic material particles are configured so that the resin can be poured into the stator chamber to fill between the plurality of spherical inorganic material particles;
  wherein the silicone resin is a cured silicone resin.

2. The canned motor pump according to claim 1, wherein vibration is applied to the stator chamber when filling the dried spherical inorganic material particles into the stator chamber.

3. The canned motor pump according to claim 1, wherein the spherical inorganic material particles are spherical ceramic particles or glass beads.

4. A method for filling a filling member into a stator chamber of a canned motor pump including a stator can in a cylindrical shape positioned between a rotor and a stator of a motor, and a motor housing forming, together with the stator can, a stator chamber for installing the stator, the method comprising:
 filling dried spherical inorganic material particles having a first heat conductive rate into the stator chamber so as to contact each other;
 thereafter pouring silicone resin into the stator chamber so as to be introduced into between the spherical inorganic material particles filled, and
 thereafter curing the silicon resin poured into the stator chamber by heating and drying to thereby bond the filled spherical inorganic material particles to each other, and having a second heat conductive rate higher than the first heat conductive rate.

5. The method for filling a filling member into a stator chamber of a canned motor pump according to claim 4, wherein the silicone resin is poured after reducing the silicon resin with solvent to thereby decrease viscosity of the silicon resin.

* * * * *